US010266668B2

(12) United States Patent
Lesho

(10) Patent No.: US 10,266,668 B2
(45) Date of Patent: Apr. 23, 2019

(54) NUCLEATING AGENT ADDITIVE COMPOSITIONS FOR POLYMERIC MATERIALS

(71) Applicant: ColorMatrix Holdings, Inc., Avon Lake, OH (US)

(72) Inventor: John Lesho, Homerville, OH (US)

(73) Assignee: ColorMatrix Holdings, Inc., Berea, OH (US)

(*) Notice: Subject to any disclaimer, the term of this patent is extended or adjusted under 35 U.S.C. 154(b) by 30 days.

(21) Appl. No.: 15/514,995

(22) PCT Filed: Sep. 28, 2015

(86) PCT No.: PCT/US2015/052575
§ 371 (c)(1),
(2) Date: Mar. 28, 2017

(87) PCT Pub. No.: WO2016/053833
PCT Pub. Date: Apr. 7, 2016

(65) Prior Publication Data
US 2018/0230288 A1 Aug. 16, 2018

Related U.S. Application Data

(60) Provisional application No. 62/058,452, filed on Oct. 1, 2014.

(51) Int. Cl.
| | |
|---|---|
| *C08K 3/22* | (2006.01) |
| *C08K 3/26* | (2006.01) |
| *C08K 5/00* | (2006.01) |
| *C08K 5/098* | (2006.01) |
| *C08L 27/06* | (2006.01) |
| *B01D 53/28* | (2006.01) |

(52) U.S. Cl.
CPC ............... *C08K 3/26* (2013.01); *B01D 53/28* (2013.01); *C08K 3/22* (2013.01); *C08K 5/0083* (2013.01); *C08K 5/098* (2013.01); *C08L 27/06* (2013.01); *C08K 2003/222* (2013.01); *C08K 2003/2206* (2013.01); *C08K 2003/262* (2013.01)

(58) Field of Classification Search
CPC .. C08L 27/06; C08K 3/22; C08K 3/26; C08K 5/09
See application file for complete search history.

(56) References Cited

U.S. PATENT DOCUMENTS

| | | | |
|---|---|---|---|
| 3,062,758 A | * | 11/1962 | Rainer ............... C08J 3/226 521/145 |
| 3,808,300 A | | 4/1974 | Miyamoto et al. |
| 4,048,208 A | | 9/1977 | Spicuzza, Jr. et al. |
| 4,572,740 A | | 2/1986 | Kretzschmann et al. |
| 5,225,107 A | | 7/1993 | Kretzschmann et al. |
| 5,234,963 A | * | 8/1993 | Garcia ............... B29B 9/065 521/143 |
| 5,446,111 A | | 8/1995 | Rotter et al. |
| 5,997,768 A | * | 12/1999 | Scully, Jr. ............ C08K 3/22 252/183.11 |
| 6,465,551 B1 | | 10/2002 | Zhao et al. |
| 6,534,574 B1 | | 3/2003 | Zhao et al. |
| 7,144,972 B2 | | 12/2006 | Hayes |
| 7,847,002 B2 | | 12/2010 | Cavalier et al. |
| 8,318,863 B2 | | 11/2012 | Kawamura et al. |
| 2007/0110984 A1 | | 5/2007 | Reedy |
| 2009/0215916 A1 | | 8/2009 | Krohnke et al. |
| 2014/0030521 A1 | | 1/2014 | Reedy |

FOREIGN PATENT DOCUMENTS

CN 101250249 A 8/2008

OTHER PUBLICATIONS

Xu, Tongbao, "Application of dehumidifying desiccant in engineering plastics" Plastics Modification Technology, p. 244 (2012).
Wang Jue et al., "4.2 Technical essentials of modified plastic preparation," Chapter 4: Formula design, key technologies, and key raw materials and additives in modified plastic, p. 155 (2014).

* cited by examiner

*Primary Examiner* — Brieann R Johnston
(74) *Attorney, Agent, or Firm* — John H. Hornickel; Michael J. Sambrook

(57) ABSTRACT

A polymeric melt composition includes a polymeric material and a nucleating agent additive composition. The nucleating agent additive composition includes (a) at least one carbonate or bicarbonate, (b) at least one organic acid or its salt, and (c) at least one desiccant. The polymeric material is unfoamed by the additive composition. The additive composition can induce polymer nucleation, such that the rate of production for polymeric articles made by melt forming processes such as injection molding can be improved, even when the carbonate or bicarbonate is present at only very low levels in the polymeric melt composition from which the polymeric articles are shaped.

19 Claims, No Drawings

NUCLEATING AGENT ADDITIVE COMPOSITIONS FOR POLYMERIC MATERIALS

CLAIM OF PRIORITY

This application claims priority from U.S. Provisional Patent Application Ser. No. 62/058,452 filed on Oct. 1, 2014, which is incorporated by reference.

FIELD OF THE INVENTION

This invention relates to nucleating agent additive compositions for polymeric materials, and, more particularly, the use of nucleating agent additive compositions in polymeric melt compositions for the production of polymeric articles by melt forming processes such as injection molding.

BACKGROUND OF THE INVENTION

Polymers are widely employed to produce functional and decorative articles. These polymeric articles are predominantly produced by a melt forming process, such as injection molding, extrusion molding, extrusion blow molding, calendering, thermoforming, or 3D printing.

Nucleating agents can be used as additives for polymeric melt compositions comprising thermoplastic polymer resins in the manufacture of polymeric articles by the aforementioned melt forming processes. In general, nucleating agents can be used to induce a crystalline structure in a polymer during solidification of a plastic melt. Moreover, nucleating agents can increase the crystallization temperature ($T_a$) and the rate of crystallization ($R_c$) of the polymer resin. Such an effect can be commercially useful. As described by Stuart Fairgrieve in "Nucleating Agents", *Rapra Review Reports*, Vol. 16, No. 7 (2005), with the use of nucleating agents, it is possible, for example, to increase rates of production of injection molded articles given that, with a higher $T_c$, less cooling of the mold is required, and, with a higher $R_c$, an article can be removed sooner from the mold. Fairgrieve (2005) discloses that nucleation of polymer crystallization in commercial processes can be influenced by the addition of "low levels", which is characterized by Fairgrieve (2005) as generally between about 0.01 and 1 wt %, of certain additives specifically selected for this purpose.

One type of nucleating agent that can increase rates of production for at least some polymeric articles is saturated dicarboxylate salts. This type of compound includes, for example, saturated bicyclic dicarboxylate salts, and, specifically, disodium bicyclo[2.2.1]heptanedicarboxylate, available from Milliken & Company under the HYPERFORM HPN-68 trademark. Compounds of this type are disclosed in, for example, U.S. Pat. Nos. 6,465,551 and 6,534,574 both to Zhao et al. Generally, saturated dicarboxylate salts are designed for use as a nucleating agent for polyolefins such as polypropylene. Additionally, saturated dicarboxylate salts are relatively expensive. As a result, use of saturated dicarboxylate salts may not be technically suitable for polymeric materials other than polyolefins, or cost-effective for lower-cost or commodity-type polymeric materials such as polyvinylchloride.

Other types of additives also can be referred to as "nucleating agents". However, such additives typically are used for different purposes to produce different types of products than those for which the nucleating agents discussed above typically are used. Namely, such additives that also can be referred to as "nucleating agents" are more precisely used as foaming agents or cell regulators or both in the production of foamed or expanded plastics. In this context, the so-called "nucleating agents" are added to induce and/or regulate the formation of tiny gas bubbles to provide the desired foaming.

For example, U.S. Pat. No. 4,048,208 to Spicuzza, Jr., et al., discloses that expanded polystyrene sheet can be made from a mixture including a nucleating system in an amount from 0.01 to 5%, and preferably, 0.05 to 3%, based on the total weight of polymer. Nucleating systems useful in the invention disclosed by Spicuzza include carbon dioxide, nitrogen, compounds which decompose to produce carbon dioxide or nitrogen, and mixtures which react to produce carbon dioxide or nitrogen, such as mixtures of alkali or alkaline earth carbonates and organic acid (e.g., sodium bicarbonate and citric acid). An exemplified mixture contains 0.2% sodium bicarbonate and 0.2% citric acid together with 5.5% n-pentane, 0.1% hydrophilic silica, 0.1% magnesium oxide, and a balance of extrusion grade expandable polystyrene particles. The mixture is used to produce an extruded expanded sheet product, which is reported as having foam cells with diameters generally in the range of 2 to 3 mils.

As further examples, U.S. Pat. Nos. 4,572,740 and 5,225,107 both to Kretzschmann et al., disclose that it is known to use citric acid together with sodium bicarbonate as a blowing agent or as a so-called "active nucleating agent" that serves as a pore regulator in the production of foamed plastics. U.S. Pat. No. 4,572,740 further discloses the use of 0.4% of a standard commercial blowing agent consisting of sodium bicarbonate and citric acid, and the use of 0.1 to 10% of certain citric acid esters as blowing agents, and the use of 0.05 to 5.0% of certain citric acid esters as nucleating agents, all for the production of foamed plastics. U.S. Pat. No. 5,225,107 further discloses that a citric acid and sodium bicarbonate system is effective as a pore regulator in the production of foamed plastics when added in amounts from 0.4 to 1.0%, and that amounts as low as 0.09% of monosodium citrate and 0.07% of sodium bicarbonate can be used together with 0.25% of talc for nucleating directly gassed thermoplastic foams.

Each of the disclosures of the three aforementioned patent references is limited to the production of foamed plastics and fails to address nucleating agents that are intended for use in the production of unfoamed plastics. That is, these patents do not contemplate the use of nucleating agents for the purpose of inducing a crystalline structure in a polymer, for example, by increasing $T_c$ and $R_c$ such that rates of production can be increased for polymeric articles made from melt forming processes such as injection molding.

SUMMARY OF THE INVENTION

Consequently, a need exists for nucleating agent additive compositions that are relatively low-cost and that also are capable of inducing a crystalline structure in a polymer during solidification of a plastic melt such that it is possible to increase rates of production of polymeric articles made by melt forming processes such as injection molding. Such a need exists especially for polymeric articles made from lower-cost or commodity-type polymeric materials such as polyvinylchloride.

The aforementioned needs are met by one or more aspects of the present invention.

One aspect of the invention is a nucleating agent additive composition that includes (a) at least one carbonate or bicarbonate, (b) at least one organic acid or its salt, and (c) at least one desiccant.

Another aspect of the invention is a polymeric melt composition that includes a polymeric material and the aforementioned additive composition. In the polymeric melt composition, the polymeric material is unfoamed by the additive composition.

A further aspect of the invention is a polymeric article shaped from the aforementioned polymeric melt composition.

An even further aspect of the invention is a process for making a polymeric article. The process includes the steps of (a) providing the aforementioned polymeric melt composition; and (b) shaping the polymeric melt composition to provide the polymeric article. In the process, the step of shaping has a cycle time that is at least about 5% percent lower, and, is some embodiments, at least about 10% lower, and, in other embodiments, at least about 20% lower, and in further embodiments, at least about 25% lower, and, in even further embodiments, at least about 30% lower, than a comparable cycle time for the same step of shaping in the same process but in which a comparable polymeric melt composition is essentially free of the additive composition.

Surprisingly, it has been found that the additive composition can induce a crystalline structure in an unfoamed polymeric material that is shaped into a polymeric article by a melt forming process such as injection molding, even when the carbonate or bicarbonate of the additive composition is present in a polymeric melt composition at very low levels, such as when the carbonate or bicarbonate is minimally present in the polymeric melt composition. The induced nucleation, in turn, can significantly improve the rate of production (e.g., the cycle time of a shaping step) of the polymeric article. Moreover, by improving the rate of production, not only can production costs be reduced (e.g., reduced energy requirements), throughput can be increased. An increase in throughput can allow for reduction in the heat history for a polymeric article. A reduction in the heat history can be beneficial because degradation of the polymeric material can result from the heating necessarily applied in the melt forming process. Therefore, an increase in throughput and a reduction in heat history can result in polymeric articles that have experienced less degradation during the melt forming process and consequently can have improved physical properties and improved stability upon exposure to weathering/ultraviolet radiation.

Features of the invention will become apparent with reference to the following embodiments. There exist various refinements of the features noted in relation to the aforementioned aspects of the present invention. Additional features may also be incorporated in the aforementioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the present invention is directed to a nucleating agent additive composition that includes (a) at least one carbonate or bicarbonate, (b) at least one organic acid or its salt, and (c) at least one desiccant.

In other embodiments, the present invention is directed to a polymeric melt composition that includes a polymeric material and the aforementioned additive composition.

In further embodiments, the present invention is directed to a polymeric article shaped from the aforementioned polymeric melt composition.

In even further embodiments, the present invention is directed to a process for making a polymeric article.

Required and optional features of these and other embodiments of the present invention are described herein.

As used herein, the term "essentially free of" with respect to a certain component means that no amount of that component is intentionally incorporated into a composition.

As used herein, the term "foamed" with respect to any polymeric material means a polymeric material to which one or more foaming or blowing agents is intentionally incorporated at a concentration sufficient to cause the formation of foam cells in the polymeric material such that the density of the polymeric material is reduced relative to the density of the same polymeric material that is essentially free of the same foaming or blowing agents. The density of the foamed polymeric material can be, in some embodiments, at most 99%, and, in other embodiments at most 95%, and in further embodiments, at most 90%, and, in even further embodiments, at most 80%, of the density of the same polymeric material that is essentially free of the same foaming or blowing agents.

As used herein, the term "minimally present" with respect to a certain component means that, in some embodiments, less than 0.5 weight percent of the component is intentionally incorporated into a composition; and, in other embodiments, less than 0.1 weight percent of the component is intentionally incorporated into a composition; and, in further embodiments, less than 0.05 weight percent of the component is intentionally incorporated into a composition; and, in even further embodiments, less than 0.025 weight percent of the component is intentionally incorporated into a composition; and, in some embodiments, at least 0.005 weight percent of the component is intentionally incorporated into a composition; and, in other embodiments, at least 0.0075, weight percent of the component is intentionally incorporated into a composition; and, in further embodiments, at least 0.009 weight percent of the component is intentionally incorporated into a composition; and, in even further embodiments, at least 0.01 weight percent of the component is intentionally incorporated into a composition.

As used herein, the term "nucleation" means inducement of a crystalline structure in a polymeric material during the solidification of a plastic melt. The term "nucleating agents" means a substance that contributes to nucleation according to the aforementioned definition. The term "nucleation" as used herein does not mean inducement of the formation of tiny gas bubbles in a foamed plastic.

As used herein, the term "rigid" with respect to any polymeric material means a polymeric material that comprises, in some embodiments, less than 20 weight percent, and, in other embodiments, less than 10 weight percent, of a plasticizer and is used to form substantially rigid or semi-rigid polymeric articles.

As used herein, the term "unfoamed" with respect to any polymeric material means a polymeric material that is not intentionally foamed.

Polymeric Material

The additive composition of the present invention can be used as a nucleating agent for one or more polymeric materials. Polymeric materials of the present invention are unfoamed.

The polymeric material can include any thermoplastic polymer which can be used to produce a polymeric article by a melt forming process including but not limited to injection molding, extrusion molding, extrusion blow molding, calendering, thermoforming, or 3D printing.

Non-limiting examples of suitable thermoplastic polymers include polyesters, polycarbonates, polyamides, polyolefins, polystyrenes, vinyl polymers, and acrylic polymers, including copolymers and blends of any of the foregoing.

In some embodiments, the thermoplastic polymer is a polyvinylchloride (PVC), chlorinated PVC, or an alloy thereof, such as PVC/butyl acrylate.

As used herein, the term "PVC" is intended to include both homopolymers and copolymers of vinyl chloride; that is, vinyl resins containing vinyl chloride units in their structure, for example, copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether, and the like.

In some embodiments, the polymeric material is a vinyl chloride homopolymer (i.e., polyvinylchloride). In further embodiments, the polymeric material is a rigid PVC.

Carbonate or Bicarbonate

The additive composition of the present invention includes a carbonate or bicarbonate.

It is believed that inclusion of the carbonate or bicarbonate in an additive composition that is combined with a polymeric material in a polymeric melt composition can induce nucleation (i.e., induce a crystalline structure in the polymeric material) such that the rate of production for polymeric articles shaped from the polymeric melt composition by melt forming processes such as injection molding can be improved relative to the rate of production for polymeric articles shaped from a polymeric melt composition that is essentially free of the additive composition. Surprisingly, significant improvement in the rate of production can occur even when the carbonate or bicarbonate is present in the polymeric melt composition at very low levels, such as when the carbonate or bicarbonate is minimally present in the polymeric melt composition.

Carbonates or bicarbonates that are suitable for use in the present invention can be carbonates or bicarbonates of alkali metals or alkaline earth metals or of ammonium. For example, carbonates or bicarbonates of sodium, potassium, and calcium can be used.

In some embodiments, the carbonate or bicarbonate is sodium bicarbonate.

In further embodiments, the carbonate or bicarbonate is a treated carbonate or bicarbonate, such as a treated sodium bicarbonate. For example, the carbonate or bicarbonate can be treated with a long chain, for example, $C_{12}$ to $C_{21}$, fatty acid or its salt, including but not limited to alkali metal and alkaline earth metal salts such as sodium, potassium, magnesium, or calcium salts of long chain fatty acids.

In some embodiments, the carbonate or bicarbonate has an average particle size that is less than about 4 microns, for example, ranging from about 2 microns to about 4 microns.

In some embodiments, the carbonate or bicarbonate is minimally present in the polymeric melt composition.

Organic Acid or its Salt

The additive composition of the present invention includes an organic acid or its salt.

The organic acid or its salt can be included in the additive composition as an activator for the carbonate or bicarbonate.

Organic acids that are suitable for use in the present invention include solid organic acids, for example, citric acid, oxalic acid, succinic acid, adipic acid, and pthalic acid.

Suitable salts include, for example, alkali metal, alkaline earth metal, or ammonium salts of any of the aforementioned acids. Non-limiting examples of salts include monosodium citrate, calcium citrate, and monoammonium citrate.

In some embodiments, the organic acid or its salt is monosodium citrate.

In some embodiments, the organic acid or its salt is minimally present in the polymeric melt composition.

Desiccant

The additive composition of the present invention includes a desiccant.

It is believed that inclusion of the desiccant in the additive composition can aid in eliminating splay and improve surface aesthetics in polymeric articles made by melt forming processes such as injection molding.

Non-limiting examples of desiccants include alumino silicates, silica gel, sodium alumino silicates, calcium silicates, calcium sulfate, magnesium sulfate, calcium chloride, montmorillonite clay, molecular sieves, alkaline earth metal oxides such as oxides of calcium or magnesium, alkaline earth metal chlorides such as chlorides of calcium or magnesium, metal silanes such as tetraethoxysilane or vinyl silanes, and hydrides, such as calcium hydride and lithium hydride.

In some embodiments, the desiccant is an alkaline earth metal oxide such as calcium oxide.

In some embodiments, the desiccant is minimally present in the polymeric melt composition.

Liquid Carrier

In some embodiments, the additive composition of the present invention can be in the form of a dispersion and can include a liquid carrier. The liquid carrier is the medium in which the other components of the additive composition are dispersed to form a dispersion.

The liquid carrier must be compatible with the polymeric material. Additionally, the liquid carrier must be compatible with the other components of the additive composition.

Suitable liquid carriers are non-aqueous and can be derived from petroleum (i.e., mineral) or vegetable based sources. Non-limiting examples of suitable liquid carriers include liquid polyhydric alcohols such as polyethylene glycol, polypropylene glycol, 1,2-propane diol or propylene glycol, 1,3-propane diol, hexylene glycol, glycerin, diethylene glycol, dipropylene glycol, 1,2-butylene glycol, and 1,4-butylene glycol; mineral oil; vegetable oil; and mixtures thereof.

In some embodiments, the liquid carrier is mineral oil.

In other embodiments, the liquid carrier can be an alkyl tin mercaptan such as methyl tin mercaptan or butyl mercaptan.

Surfactant

In some embodiments, the additive composition of the present invention can be in the form of a dispersion and can include a surfactant. The surfactant acts as an emulsifier and aids in maintaining the colloidal stability of the dispersion of the additive composition.

Any surfactant that serves as a suitable emulsifier and provides the desirable colloidal stability for the dispersion can be used in the present invention. For example, suitable surfactants can be animal-based, vegetable-based, or polymeric. Further, suitable surfactants can be anionic, zwitterionic, amphoteric, cationic, and nonionic, and can include one surfactant or a combination of two or more surfactants.

Those skilled in the art of dispersion formulation, without undue experimentation but with use of such references as McCutcheon's Volume 1: Emulsifiers and Detergents, North American and International editions, 2014 Annual, published by M.C. Publishing Company, can select from many types of surfactants for inclusion in the present invention.

In some embodiments, the surfactant is a fatty acid ester ethoxylate such as polyoxyethylene (20) sorbitan trioleate.

Filler

The additive composition of the present invention, in some embodiments, can include filler. Filler can be used to increase the bulk density of the additive composition and improve its flow characteristics.

Any filler that can provide desirable flow characteristics to the additive composition can be used in the present invention. Generally, particulate inorganic fillers are suitable for use.

Such inorganic fillers include, for example, metal atoms of Groups I to VIII of the periodic table (e.g., Fe, Na, K, Cu, Mg, Ca, Zn, Ba, Al, Ti) and silicon, and the oxides, hydroxides, carbonates, sulfates, silicates and sulfites of these metallic elements, and various clay minerals in which some of these compounds are present.

Non-limiting examples of inorganic mineral fillers include iron oxide, zinc oxide, magnesium oxide, titanium oxide, zirconium oxide, titanium dioxide, alumina, silica, silica-alumina, aluminum hydroxide, magnesium hydroxide, calcium hydroxide, magnesium carbonate, calcium carbonate (heavy, light, colloidal), barium sulfate, calcium sulfate, sodium sulfate, calcium sulfite, calcium silicate, calcium phosphate, magnesium phosphate, talc, mica, kaolin, clay, wollastonite, hydrotalcite, glass beads, glass powders, silica sand, silica rock, silicon nitride, quartz powder, volcanic pumice, diatomaceous earth, white carbon, iron powder and aluminum powder.

In some embodiments, the filler is calcium carbonate, calcium sulfate, or mixtures thereof.

Other Optional Additives

The additive composition of the present invention, in some embodiments, can include conventional plastics additives in an amount that is sufficient to obtain a desired processing or performance property. The amount should not be wasteful of the additive nor detrimental to the processing or performance of the additive composition or a polymeric melt composition comprising the additive composition. Those skilled in the art of thermoplastics formulation and processing, without undue experimentation but with reference to such treatises as *Plastics Additives Database* (2004) from Plastics Design Library (elsevier.com), can select from many different types of additives for inclusion into the additive compositions of the present invention.

Non-limiting examples of optional additives include adhesion promoters; antioxidants; biocides (antibacterials, fungicides, and mildewcides), anti-fogging agents; anti-static agents; bonding agents; dispersants; smoke suppressants; expandable char formers; impact modifiers; initiators; lubricants; pigments, colorants and dyes; oils and plasticizers; processing aids; other polymers; release agents; silanes, titanates and zirconates; slip and anti-blocking agents; stabilizers; stearates; tackifiers; ultraviolet light absorbers; viscosity modifiers; waxes; and combinations of them.

Ranges of Ingredients in the Additive Composition

Table 1 below shows the acceptable, desirable, and preferable ranges of ingredients for the additive composition of the present invention, based on the total weight of the additive composition.

The additive compositions of the present invention can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise, any disclosed number is intended to refer to exactly the disclosed number, "about" the disclosed number, or both exactly the disclosed number and "about" the disclosed number.

TABLE 1

| Additive Compositions (wt. %) | | | |
|---|---|---|---|
| Ingredient | Acceptable | Desirable | Preferable |
| Carbonate or Bicarbonate | 1-10 | 3-8 | 5-6 |
| Organic Acid or Its Salt | 0.5-4 | 0.7-3 | 0.8-2 |
| Desiccant | 0.5-4 | 0.7-3 | 0.8-2 |
| Liquid Carrier | 30-50 | 32-45 | 35-40 |
| Surfactant | 10-50 | 15-40 | 18-30 |
| Filler | 0-50 | 10-40 | 25-35 |
| Viscosity Modifier | 0-5 | 0.5-4 | 1-2 |
| Other Optional Additives | 0-25 | 0-10 | 0-5 |

The weight percents of the components shown in Table 1 above are on a basis of the total weight of the additive composition. The weight percents of the components on a basis of the total weight of the polymeric melt composition depend upon the dilution or "let-down" rates of the additive composition into the polymer resin of the polymeric material to provide the polymeric melt composition. Suitable let-down rates are described below.

Processing

The preparation of additive compositions of the present invention, which can be in the form of dispersions, is uncomplicated. The additive compositions of the present invention can be made in batch or continuous operations.

Mixing in a batch or continuous process typically occurs in a batch mixer or a continuous mixer, respectively, operating at ambient temperature with addition of the solid ingredients into the liquid concurrently or sequentially. Mixing speeds can range from about 1 to about 10,000 revolutions per minute (rpm), and preferably from about 20 to about 6000 rpm. Typically, the output from the mixer is the additive composition ready for storage and use.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (Elsevier.com), one can make polymeric articles of any conceivable shape and appearance using additive compositions of the present invention mixed into polymer resin(s) and optionally other ingredient(s).

Dilution or let-down rates of the additive composition into the polymer resin of the polymeric material to provide a polymeric melt composition can range, in some embodiments, from about 0.1 to about 1%, and, in other embodiments, from about 0.15 to about 0.5%, and, in further embodiments, from about 0.2 to about 0.3%, in order to achieve the desired processing characteristics and the desired quality of the polymeric articles that are shaped from the polymeric melt composition.

Usefulness of the Invention

The additive compositions of the present invention can be useful in making any desired polymeric article of a final shape made by melt forming processes such as injection molding, extrusion molding, extrusion blow molding, calendering, thermoforming, or 3D printing.

It is believed that an additive composition of the present invention that is combined with a polymeric material in a polymeric melt composition can induce nucleation (i.e., induce a crystalline structure in the polymeric material) such that the rate of production (e.g., the cycle time of a shaping step) for polymeric articles shaped from the polymeric melt composition by melt forming processes such as injection molding can be improved relative to the rate of production for polymeric articles shaped from a polymeric melt composition that is essentially free of the additive composition. Surprisingly, significant improvement in the rate of production can occur even when the carbonate or bicarbonate is present in the polymeric melt composition at very low levels, such as when the carbonate or bicarbonate is minimally present in the polymeric melt composition.

It is further believed that, by improving the rate of production, not only can production costs be reduced (e.g., reduced energy requirements), throughput can be increased. An increase in throughput can allow for reduction in the heat history for a polymeric article. A reduction in the heat history can be beneficial because degradation of the polymeric material can result from the heating necessarily applied in the melt forming process. Therefore, an increase in throughput and a reduction in heat history can result in polymeric articles that have experienced less degradation during the melt forming process and consequently can have improved quality, such as improved physical properties and improved stability upon exposure to weathering/ultraviolet radiation.

In some embodiments, a process for making a polymeric article comprises the steps of (a) providing the polymeric melt composition according to any of the aforementioned embodiments, and (b) shaping the polymeric melt composition to provide the polymeric article. In such a process, the step of shaping has a cycle time that is at least about 5% percent lower, and, is some embodiments, at least about 10% lower, and, in other embodiments, at least about 20% lower, and in further embodiments, at least about 25% lower, and, in even further embodiments, at least about 30% lower, than a comparable cycle time for the same step of shaping in the same process but in which a comparable polymeric melt composition is essentially free of the additive composition.

Additionally, it is believed that the additive composition can be especially useful as a nucleating agent for lower-cost or commodity-type polymeric materials, for example, in rigid PVC applications.

EXAMPLES

Table 2 below shows the formulation of a non-limiting example additive composition of the present invention.

TABLE 2

| Additive Composition Ingredients | Example 1 Wt. % |
|---|---|
| Liquid Carrier | 36.50 |
| Surfactant | 20.00 |
| Carbonate or Bicarbonate | 5.52 |
| Organic Acid or Its Salt | 1.00 |
| Desiccant | 0.90 |
| Filler | 34.10 |
| Viscosity Modifier | 1.50 |
| Other Optional Additives | 0.48 |
| TOTAL | 100.00 |

The additive composition of Example 1 was let down at a rate of about 0.25% into rigid PVC resin to provide a polymeric melt composition that was formed into rigid PVC polymeric articles by injection molding.

Consequently, only about 0.0138 weight percent of the carbonate or bicarbonate was present in the polymeric melt composition, by weight of the polymeric melt composition (i.e., [(5.52 parts of Carbonate or Bicarbonate/100 parts of Additive Composition)×(0.25 parts of Additive Composition/100 parts of Polymeric Melt Composition)=(0.0138 parts of Carbonate or Bicarbonate/100 parts of Polymeric Melt Composition)=0.0138 wt % of Carbonate or Bicarbonate in the Polymeric Melt Composition]).

By using the additive composition of Example 1 in the production of rigid PVC polymeric articles by injection molding, even at a let-down rate of about 0.25% resulting in only about 0.0138 weight percent of carbonate or bicarbonate being present in the polymeric melt composition, the observed benefits included significantly faster (i.e., lower) cycle times, reduced polymer degradation, improved product quality, improved weathering and UV stability, improved flow/intrinsic viscosity, process stability, dimensional stability of the polymer articles, lower scrap rate, significant reduction in process temperatures, reduced energy requirements, reduction in molded part temperatures, and improved heat dissipation.

Without undue experimentation, those having ordinary skill in the art can utilize the written description of the present invention, including Example 1, to formulate nucleating agent additive compositions for use in making any desired polymeric article of a final shape by melt forming processes such as injection molding with improved rates of production and improved product quality.

Examples 2-15

Examples 2-15 further elaborate upon the invention. Table 3 shows the ingredients of the additive for Examples 2 and 3. Each formulation was made by high speed dispersing first the liquid ingredients and then slowly incorporating the dry ingredients. When all dry components of the formulation are "wet out" in the liquid components, an ambient temperature is measured, followed by vigorous dispersion until there is a rise in temperature of about 10° F. (5.6° C.) caused by the physical mixing of the ingredients and resulting in a shear heat rise and reflecting the amount of work applied to provide a usable dispersion.

Table 4 shows the use of the Examples 2-3 with various polymers at various let-down ratios (LDR) using various types of molding equipment. In all cases, the equipment included use of a CMG3000P Controller, a Court RTA tube assembly, a dual port adapter plate, and a stainless steel nozzle, except Example 4 which used a CMG3000P Controller. The results were reported for Examples 4-15, which used Examples 2 and 3, respectively.

TABLE 3

| Ingredient Name | Generic Chemistry and Source | 2 Wt. % | 3 Wt. % |
|---|---|---|---|
| | Mineral Oil (Drake 70 weight white oil) | 36.5 | 53 |
| | Sorbitan Trioleate | 20 | 2 |
| | Sodium Bicarbonate (4-8 micrometer average particle size) | 6 | 6 |
| | Monosodium Citrate | 1 | 1 |
| | Calcium oxide | 0.9 | 0.9 |
| | Calcium Carbonate | 34.1 | 34.1 |
| | Organo Clay (Tixogel ® MP 100 from Southern Clay) | 1.5 | 3 |
| | | 100.00 | 100.00 | affecting either the molding process or the molded part. A person having ordinary skill in the art would be able to utilize Table 4 to adapt the let-down ratio usage of additive of the invention with a variety of polymer resins in a variety of molding conditions.

Another series of experiments was conducted replacing the mineral oil of Examples 2 and 3 with methyl tin mercaptan as the liquid carrier in the same amount, resulting in acceptable, comparable results of reduced cycle time when used with PVC as the polymeric material in a let down ratio of 0.45%.

All documents cited in the Embodiments of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and

TABLE 4

| Example | Additive Used | LDR | Polymer Type | Machine Tonnage | Results Compared with No Example 2 or 3 Additive Used |
|---|---|---|---|---|---|
| 3 | Example 2 | 0.25% | Polypropylene | 300 | 1. Reduced barrel temperatures and cooling time.<br>2. Reduced cycle time by 7 seconds.<br>3. Dimensional stability was maintained.<br>4. Recovery time increased by 1 second |
| 4 | Example 2 | 0.45% | Rigid PVC | 1000 | 1. Reduced barrel temperature and cooling time.<br>2. Reduced cycle time by 55 seconds.<br>3. Dimensional stability was maintained<br>4. Screw recovery time was not affected. |
| 5 | Example 2 | 0.35% | Rigid PVC | 1000 | 1. Reduced barrel temperatures and cooling time.<br>2. Reduced cycle time by 55 seconds.<br>3. Dimensional stability was maintained.<br>4. Screw recovery time was not affected. |
| 6 | Example 2 | 0.25% | Rigid PVC | 1000 | 1. Reduced barrel temperatures and cooling time.<br>2. Reduced cycle time by 55 seconds.<br>3. Dimensional stability was maintained.<br>4. Screw recovery time was not affected. |
| 7 | Example 2 | 0.15% | Rigid PVC | 1000 | 1. Reduced barrel temperatures and cooling time.<br>2. Reduced cycle time by 55 seconds.<br>3. Dimensional stability was maintained.<br>4. Screw recovery time was not affected. |
| 8 | Example 2 | 0.15% | Rigid PVC | 1000 | 1. Reduced barrel temperatures and cooling time.<br>2. Reduced cycle time by 50 seconds.<br>3. Dimensional stability was maintained.<br>4. Screw recovery time was not affected.<br>Optimal performance was achieved @ 0.15% LDR |
| 9 | Example 2 | 0.20% | Rigid PVC | 700 | 1. Reduced barrel temperatures and cooling time.<br>2. Reduced cycle time by 17 seconds.<br>3. Dimensional stability was maintained.<br>4. Screw recovery time was not affected |
| 10 | Example 2 | 0.45% | PVC | 400 | 1. Reduced barrel temperatures and cooling time.<br>2. Reduced cycle time by 12 seconds.<br>3. Dimensional stability was maintained.<br>4. Screw recovery time was not affected. |
| 11 | Example 3 | 0.45% | PVC | 400 | 1. Reduced barrel temperatures and cooling time.<br>2. Reduced cycle time by 12 seconds.<br>3. Dimensional stability was maintained.<br>4. Screw recovery time was not affected. |
| 12 | Example 3 | 0.25% | High Density Polyethylene | 1200 | 1. Reduced barrel temperature 20° to 60° F. (11°-33° C.)<br>2. Screw recovery was not affected. |
| 13 | Example 3 | 0.35% | High Density Polyethylene | 1200 | 1. Reduced barrel temperature 20° to 60° F. (11°-33° C.)<br>2. Screw recovery was not affected. |
| 14 | Example 3 | 0.45% | High Density Polyethylene | 1200 | 1. Reduced barrel temperature 20° to 60° F. (11°-33° C.)<br>2. Screw recovery was not affected. |
| 15 | Example 3 | 0.55% | High Density Polyethylene | 1200 | 1. Reduced barrel temperature 20° to 60° F. (11°-33° C.)<br>2. Screw recovery was not affected. |

As demonstrated in the Results for Examples 4-15, Examples 2 and 3 are very useful with a variety of polymer resins in a variety of tonnage of equipment. Where measured, cycle time of molding improved without adversely modifications can be made without departing from the spirit and scope of the invention. It is therefore intended to cover in the appended claims all such changes and modifications that are within the scope of the present invention.

What is claimed is:

1. A polymeric melt composition comprising:
   (a) a polymeric material; and
   (b) an additive composition comprising:
      (i) at least one carbonate or bicarbonate;
      (ii) at least one organic acid or its salt; and
      (iii) at least one desiccant;
   wherein the polymeric material is unfoamed by the additive composition and wherein the additive composition is in the form of a dispersion and further comprises a liquid carrier and at least one surfactant.

2. The polymeric melt composition according to claim 1, wherein the additive composition induces a crystalline structure in the polymeric material upon solidification from a melt.

3. The polymeric melt composition according to claim 1, wherein the carbonate or bicarbonate is selected from the group consisting of sodium carbonate, sodium bicarbonate, and mixtures thereof.

4. The polymeric melt composition according to claim 1, wherein the organic acid or its salt is citric acid or a salt of citric acid, and wherein the salt of citric acid is selected from the group consisting of monosodium citrate, calcium citrate, monoammonium citrate, and mixtures thereof.

5. The polymeric melt composition according to claim 1, wherein the desiccant is an alkaline earth metal oxide selected from the group consisting of calcium oxide, magnesium oxide, and mixtures thereof.

6. The polymeric melt composition according to claim 1, wherein:
   (a) the carbonate or bicarbonate is present from about 1 to about 10 weight percent, based on the total weight of the additive composition;
   (b) the organic acid or its salt is present from about 0.5 to about 4 weight percent, based on the total weight of additive composition; and
   (c) the desiccant is present from about 0.5 to about 4 weight percent, based on the total weight of additive composition; and
   wherein the additive composition is added into the polymeric material at a let-down rate from about 0.1 weight percent to about weight percent.

7. The polymeric melt composition according to claim 1, wherein:
   (a) the liquid carrier is present from about 30 to about 50 weight percent, based on the total weight of additive composition; and
   (b) the surfactant is present from about 10 to about 50 weight percent, based on the total weight of the additive composition; and
   wherein the additive composition is added into the polymeric material at a let-down rate from about 0.1 weight percent to about 1 weight percent.

8. The polymeric melt composition according to claim 1, wherein the additive composition further comprises from about 10 to about 50 weight percent of filler, based on the total weight of the additive composition; and wherein the additive composition is added into the polymeric material at a let-down rate from about 0.1 weight percent to about 1 weight percent.

9. The polymeric melt composition according to claim 1, wherein the additive composition is added into the polymeric material at a let-down rate from about 0.2 weight percent to about 0.3 weight percent.

10. The polymeric melt composition according to claim 1, wherein the additive composition further comprises at least one additive selected from the group consisting of adhesion promoters; antioxidants; biocides; anti-fogging agents; anti-static agents; bonding agents; dispersants; smoke suppressants; expandable char formers; impact modifiers; initiators; lubricants; pigments, colorants and dyes; oils and plasticizers; processing aids; other polymers; release agents; silanes, titanates and zirconates; slip and anti-blocking agents; stabilizers; stearates; tackifiers; ultraviolet light absorbers; viscosity modifiers; waxes; and combinations of them.

11. The polymeric melt composition according to claim 1, wherein the polymeric material comprises a thermoplastic polymer selected from the group consisting of polyesters, polycarbonates, polyamides, polyolefins, polystyrenes, vinyl polymers, acrylic polymers, copolymers thereof, and blends thereof.

12. The polymeric melt composition according to claim 1, wherein the polymeric material comprises PVC.

13. The polymeric melt composition according to claim 1, wherein the polymeric material comprises rigid PVC.

14. A polymeric article shaped from a polymeric melt composition comprising:
   (a) a polymeric material; and
   (b) an additive composition comprising:
      (i) at least one carbonate or bicarbonate;
      (ii) at least one organic acid or its salt; and
      (iii) at least one desiccant;
   wherein the polymeric material is unfoamed by the additive composition and wherein the additive composition is in the form of a dispersion and further comprises a liquid carrier and at least one surfactant.

15. A process for making a polymeric article, the process comprising the steps of:
   (a) providing the polymeric melt composition comprising:
      (1) a polymeric material; and
      (2) an additive composition comprising:
         (i) at least one carbonate or bicarbonate;
         (ii) at least one organic acid or its salt; and
         (iii) at least one desiccant;
      wherein the polymeric material is unfoamed by the additive composition and wherein the additive composition is in the form of a dispersion and further comprises a liquid carrier and at least one surfactant; and
   (b) shaping the polymeric melt composition to provide the polymeric article;
      wherein the step of shaping has a cycle time that is at least about 20% lower than a comparable cycle time for the same step of shaping in the same process but in which a comparable polymeric melt composition is essentially free of the additive composition.

16. The process according to claim 15, wherein the step of shaping has a cycle time that is at least about 30% lower than a comparable cycle time for the same step of shaping in the same process but in which a comparable polymeric melt composition is essentially free of the additive composition.

17. The process according to claim 15, wherein the step of shaping comprises a melt forming process selected from the group consisting of injection molding, extrusion molding, extrusion blow molding, calendering, thermoforming, and 3D printing.

18. The polymeric melt composition according to claim 2,
   wherein the carbonate or bicarbonate is selected from the group consisting of sodium carbonate, sodium bicarbonate, and mixtures thereof;
   wherein the organic acid or its salt is citric acid or a salt of citric acid, and wherein the salt of citric acid is selected from the group consisting of monosodium citrate, calcium citrate, monoammonium citrate, and mixtures thereof; and wherein the desiccant is an alkaline earth metal oxide selected from the group consisting of calcium oxide, magnesium oxide, and mixtures thereof.

19. The polymeric melt composition according to claim 18, wherein the polymeric material comprises a thermoplastic polymer selected from the group consisting of polyesters, polycarbonates, polyamides, polyolefins, polystyrenes, vinyl polymers, acrylic polymers, copolymers thereof, and blends thereof.

* * * * *

UNITED STATES PATENT AND TRADEMARK OFFICE
CERTIFICATE OF CORRECTION

PATENT NO. : 10,266,668 B2
APPLICATION NO. : 15/514995
DATED : April 23, 2019
INVENTOR(S) : John Lesho It is certified that error appears in the above-identified patent and that said Letters Patent is hereby corrected as shown below:

In the Claims

Column 13, Line 42, "percent to about weight percent" should be changed to -- percent to about 1 weight percent --

Signed and Sealed this
Second Day of July, 2019

Andrei Iancu
*Director of the United States Patent and Trademark Office*